PRINTER WITH MECHANICAL READ-WRITE TRANSDUCER AND SELECTIVELY RESETTABLE INFORMATION STORAGE TAPE

Filed July 14, 1967 3 Sheets-Sheet 1

INVENTOR.

DONALD C. ROLLER

BY E. Ronald Coffman

ATTORNEY.

1

3,389,773
PRINTER WITH MECHANICAL READ-WRITE TRANSDUCER AND SELECTIVELY RESETTABLE INFORMATION STORAGE TAPE

Donald C. Roller, Lexington, Ky., assignor to International Business Machines Corporation, Armonk, N.Y., a corporation of New York Filed July 14, 1967, Ser. No. 653,365
8 Claims. (Cl. 197—20)

ABSTRACT OF THE DISCLOSURE

A unique record probe construction is provided to both read data from, and write data into a preperforated record tape. Advantage is taken of the precision quality of preperforated tape as well as its ability to receive information at a low energy level to minimize the cost of performing simple input/output tasks in a typewriter or similar printer.

DISCLOSURE OF THE INVENTION

This invention provides a wholly mechanical read-write transducer for duplicating tasks heretofore mechanically performed by separate readers and punches, or electromagnetically performed with magnetic tapes and adjuvant electronics therefor. This transducer is particularly useful for providing a low cost temporary "memory" to assist in the production of error free typed copy and in the reproduction of a relatively small number of form paragraphs. A reusable mechanical record is employed preferably comprising a prepunched or so-called "chadless" tape that is manufactured to precise dimensions and requires very low energy to "write" upon. Such a reusable memory also has the advantage of being "erasable" to permit correction of individual errors.

A principal concept employed in my invention is the construction of a record probe which is adapted to either drive a chad or other memory element from one information state to another in response to information from a typewriter, or to amplify the position of a previously set memory element to a mechanical level adequate to drive or control operation of an associated typewriter.

The probe comprises a link having a tape operating projection and is mounted on a reciprocating transfer link to either receive motion therefrom or deliver motion thereto. In a record reading operation, the probe link is selectively positioned under the control of preset chads, either in or out of the path of a reciprocating bail. The probe links positioned in the bail path are moved to deliver output motion to a typewriter or other device to be controlled via the transfer links. In a record writing mode the transfer links are selectively moved in response to operation of the typewriter or other data source. The moved transfer link displaces the probe links via a pin and cam slot connection to drive a probe projection against an "unset" chad to "set" the chad to its other operating state.

From the disclosure that follows it will be recognized that this invention has several significant attributes. By combining both the read and write functions into a single unit a savings in both space and cost is realized as compared with a conventional paper tape reader and separate punch apparatus. Additional cost savings are realized by relying on the precision of the record media rather than that of the machine for insuring reliability of operation. Further cost savings is realized by maintaining low energy

2 levels throughout the mechanism and particularly in comparison with the energy levels required in conventional paper tape punches necessitating heavier and more costly structural design. In addition to direct cost savings, this invention permits erasure and correction of individual errors with little more effort than a typist would exert in backspacing to overstrike an erroneous character.

These and other objects, features and advantages of this invention will be apparent to those skilled in the art from the following more specific description of a preferred embodiment thereof wherein specific reference is made to the accompanying drawings of which:

Figures 1, 2:
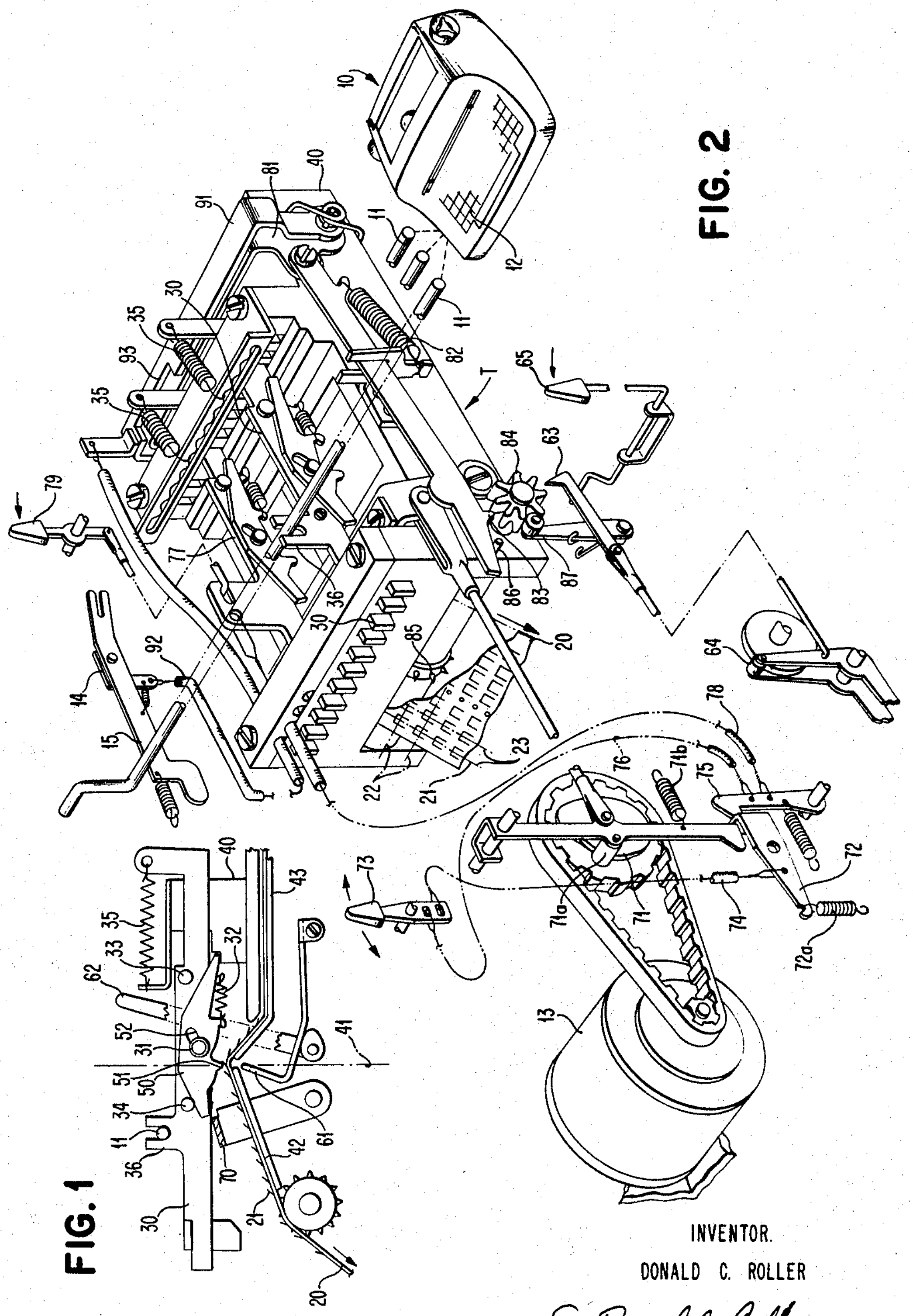
FIGURE 1 is a partial side or elevational view, in cross section of a portion of a read-write transducer constructed in accordance with this invention.
FIGURE 2 is a perspective view of a read-write transducer constructed in accordance with this invention showing a typical interconnection with mechanism of an associated typewriter and wherein certain parts have been eliminated for purposes of clarity.

Referring now more specifically to the drawings, in FIGURES 1 and 2 there is shown a mechanical read-write mechanism or transducer T. A typewriter 10 is shown generally interconnected with the transducer T, and more particularly, certain selected portions of the typewriter 10 are separately shown in larger scale for ease of understanding. The typewriter employs a multi-channel binary code to select characters on a single element type matrix.

The transducer T cooperates with a reusable record tape or data storage media 20. Media 20 has individual repeatably settable, bistably positionable projecting portions or chads 21 arranged at successive data locations 22 in a plurality of independent channels or columns 23 shown in FIGURE 2. The transducer T is provided with a plurality of interposers or transfer links 30 which are individually associated with respective channels 23 of the tape 20 and are longitudinally slidably or reciprocably mounted in a body or base member 40. Each of the transfer links 30 is provided with a probe link or sensing member 50 that is supported thereby to alternatively detect or change the state of a chad 21 by means of a projecting probe 51. Specific support for the probe link 50 is provided by a pivot pin 31 on the transfer link 30 which rides in a cam slot 52 in the probe link 50. A light spring 32 normally biases the probe link 50 counterclockwise toward a stop pin 33 on the transfer link 30. In FIGURE 1, the probe link 50 is held clockwise off of the stop pin 33 by a chad 21 at an operating or read-write station 41 along the path 42 of the record 20 defined by track 43 in the housing 40. A second stop pin 34 limits clockwise movement of the probe link 50 to provide a stable connection with the transfer link 30.

Figure 3:
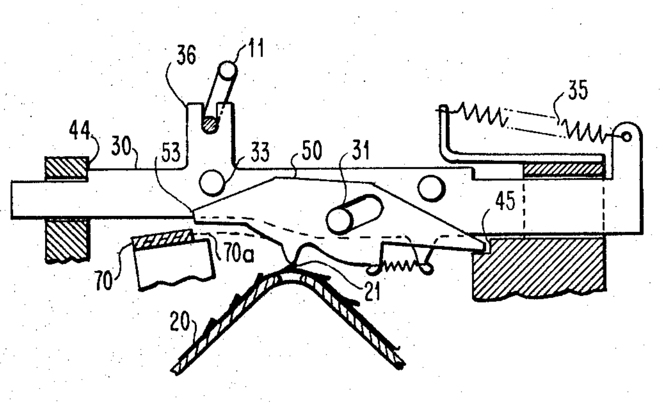
FIGURES 3, 4 and 5 are partial broken away elevational views of the mechanism of FIGURE 1 illustrating basic operational positions thereof.
Figure 4:
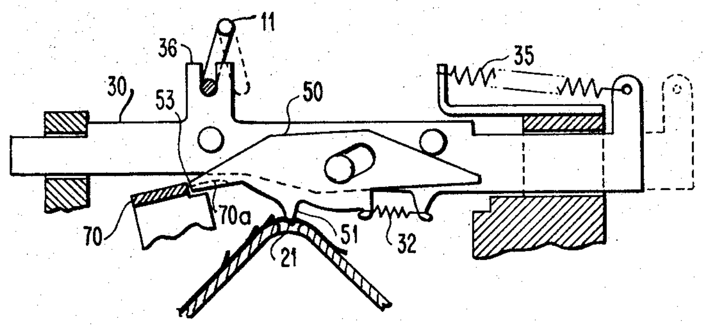
Figure 5:
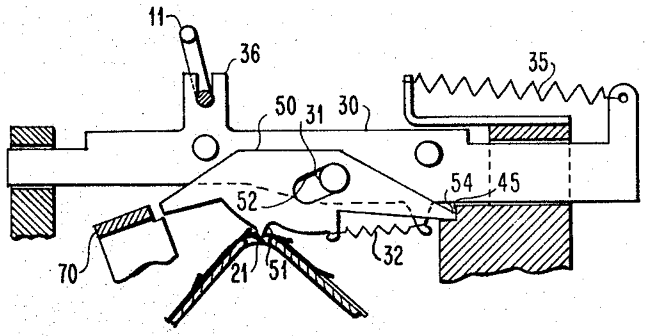

FIGURES 3 through 5 show the principal cooperative positions of a typical probe link 50, its associated transfer link 30, and the record tape 20. FIGURE 3 shows these parts in the same position as in FIGURE 1. The transfer link 30 is biased to its home position against a stop portion 44 of the frame 40 by a spring 35. In FIGURE 3 there is also shown a portion of a chopper bail or read drive member 70 that cooperates with the probe link 50 when the mechanism is in a "read" mode as hereinafter more fully explained. The chopper bail 70 oscillates from a normal position as shown, along a path 70*a* each read cycle. In a read cycle, if a chad 21 is positioned as shown in FIGURE 3, a forward or pickup end 53 of the probe link 50 will be held upwardly clear of the path 70*a* of chopper bail 70 and no lateral motion will be imparted from the chopper bail to the transfer link 30. However, if the chad 21 is set in its opposite or "down" state as shown in FIGURE 4, the probe link 50 is pivoted by its bias spring 32 to the position therein shown. In this position, probe link pickup end 53 lies in the path 70*a* of the bail 70 and the probe link is conditioned to transfer oscillating motion of the bail 70 to drive the transfer link 30 rightwardly against the bias of its spring 35 to the broken line position shown. From the foregoing consideration of FIGURES 3 and 4, it can be seen how the position of chad 21 is transduced into selective motion of the transfer link 30. The motion of the transfer link 30 can be transferred by bidirectionally operative connecting arm 36 to a movable control member such as a character selection rod 11 of a typewriter keyboard 24*b* like that described in U.S. Patent 2,919,-002, issued December 29, 1959, to L. E. Palmer, and entitled "Selection Mechanism for a Single Printing Element Typewriter."

FIGURES 3 and 5 illustrates the cooperation of the probe link 50 with the record 20 in a "write" or recording mode. Prior to recording, all chads 21 must be set to the up position as shown in FIGURE 2. This can be accomplished, for example, by a toothed arm or comb 61 (see FIGURE 1) which can be operated manually by a control lever 62. In the "record" mode of operation, bail 70 is maintained stationary in the position shown in FIGURE 3. The transfer link 30 is moved to the right as shown in FIGURE 5 from an external input connecting arm 36 whenever it is desired to set a chad 21 from its "up" to its "down" position. Conveniently, this input can be taken from the same control member or character selection rod 11 as described above. Motion of the transfer link 30 to the right brings tail portion 54 of the probe link 50 into abutting contact with a ledge 45 of the frame 40 preventing the probe link 50 from following the transfer link 30 to the right. Continued rightward motion of the transfer link 30 causes support pin 31 to cam against surface 52 of the probe link 50. The probe link 50 is thus driven downward transverse to the transfer link 30, stretching spring 32 and forcing projecting probe 50 against the chad 21 to set the chad 21 downwardly as shown in FIGURE 5.

As mentioned above, chopper bail 70 is oscillated during a "read" mode only. As shown in FIGURE 2, particularly, this oscillation is produced by a continuously rotating cam 71 preferably driven from the motor 13 of the associated typewriter 10. The cam 71 lifts a follower arm 71*a* to the left against a restore spring 71*b*. In a recording or "write" mode, arm 71*a* is retained by a primary latch 72 at its high dwell or leftmost position and thereby is prevented from following cam 71 and oscillating the bail 70. A manual control lever 73 is connected to pivot primary latch 72 clockwise against spring 72*a* through a shielded cable or similar mechanical connection 74 to start a "read" operation. Primary latch 72 is retained in its "read" mode by a control latch 75. Reading can be terminated manually by the control lever 73 which acts through shielded cable 76 to withdraw control latch 75 and permit primary latch 72 to intercept cam follower 71*a* at the end of its then current oscillation.

I prefer also to provide for automatic read termination under control of the record itself. Such automatic operation is readily provided by a special transfer link 77 similar in most respects to the transfer link 30. Transfer link 77 operates through a shielded cable 78, upon reading a "down" chad 21 as shown in FIGURE 4, to withdraw the control latch 75 and terminate oscillation of follower 71*a* in a manner as described above in connection with control lever 73. The down chad "stop code" is recorded in the tape 20 by a separate control lever 79 which acts directly on the special transfer link 77 to move it rightwardly as shown in FIGURE 5 and "set" an associated chad 21.

A pair of sensing bails 81 and 91 are positioned in the longitudinal path of the transfer links 30. Bail 81 controls feeding of the record 20 to present successive groups of chads 21 to the read-write station 41 (FIGURE 1). Bail 81 is driven rightwardly by one or more transfer links 30 during either a "read" or "write" operation. Record feed spring 82 is stretched and a record feed pawl 83 is positioned preparatory to feeding the record. Return of the transfer links 30 to the left permits bail 81 to move leftwardly and by spring 82, drive a record feed ratchet 84 and pinwheel 85 one increment forward. A lift pin 86 on the frame 40 removes pawl 83 from the ratchet 84 at the end of the record feed stroke to permit backspacing as hereinafter discussed. A spring biased detent arm 87 retains the record pinwheel 85 in its advanced position.

Bail 91 is employed to initiate a print cycle of the typewriter 10 described in aforesaid U.S. Patent 2,919,002 or in U.S. Patent 3,086,635 issued Apr. 23, 1963 to L. E. Palmer and entitled, "Keylever Storage Mechanism." A shielded cable 92 connects bail 91 to a trigger finger 14 of typewriter print cycle clutch control member 15.

In a "write" mode where operation of the typewriter causes movement of transfer links 30, the resulting pull of cable 92 from movement of bail 91 is ineffective to interfere with the printing operation of the typewriter. As later explained in greater detail, transfer links 30 can operate non-printing typewriter functions such as "line return" or "case shift." These functions do not require initiation of a print cycle and accordingly a cutout portion 93 is provided in bail 91 in alignment with the appropriate transfer links 30.

Since the record 20 is reusable, erroneous characters can be erased simply by operation of the toothed erase arm 61 by lever 62 which displaces all chads 21 at the read-write station 41 to their "up" position in readiness to receive a further recording. In support of this erasing ability, I have provided a record backspace pawl 63 which is connected to and reciprocated by a cam follower 64 in the typewriter 10 which operates the backspace mechanism thereof. Control lever 65 selectively positions pawl 63 in the path of feed ratchet 84 and when so positioned, backspacing operation of the typewriter 10 will simultaneously backspace the record 20. It will be recalled that feed pawl 83 is normally held out of the ratchet 84 by pin 86 such that backspace operation of the feed ratchet 84 is not inhibited thereby. Control lever 65 permits backspace pawl 63 to be lowered out of operative relationship with the ratchet 84 if simultaneous typewriter and record backspacing is not desired. It can be seen that the typist discovering an error in the line being typed can simply backspace to the error, operate erase lever 62 to reset the chads 21, and overstrike the erroneous character with a correct character, then start a read operation until the typing position is reached. Reading can be stopped by lever 73.

Figure 6:
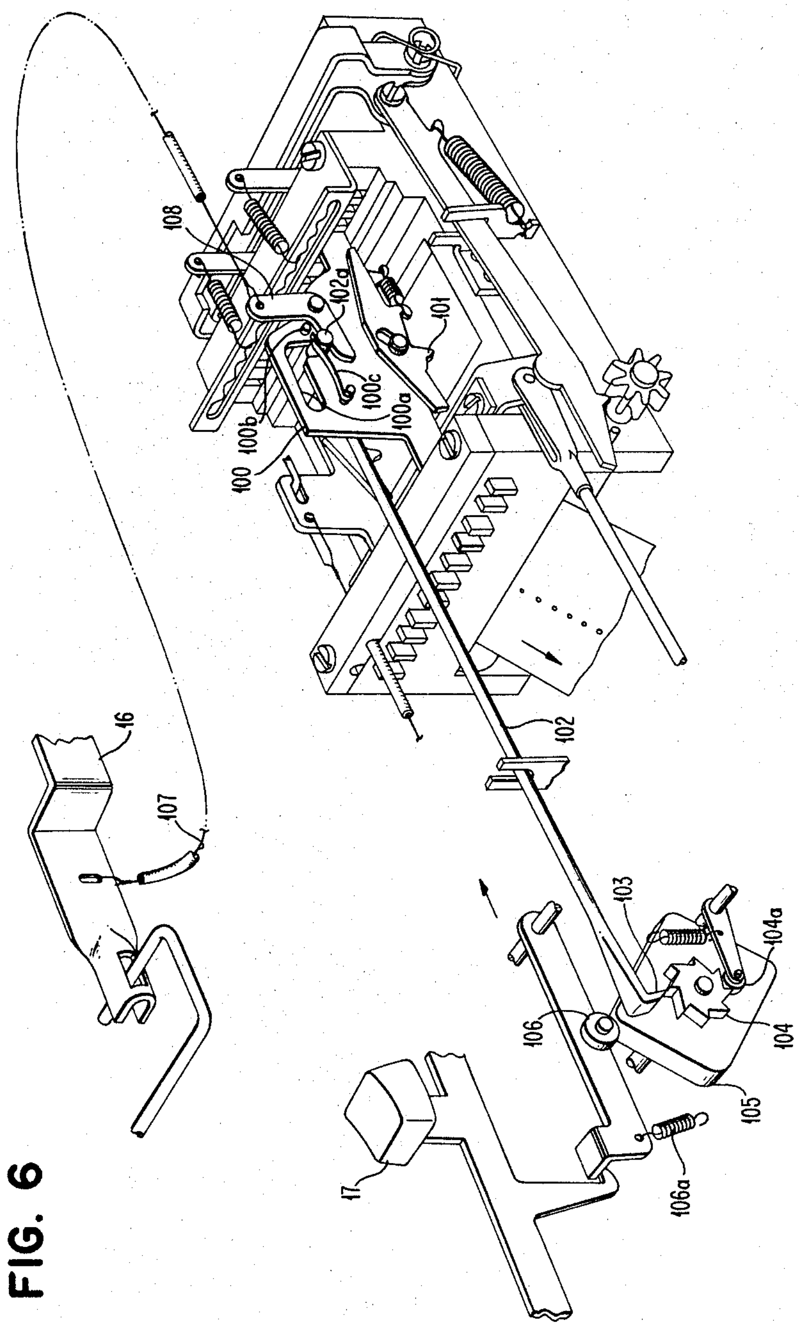
FIGURE 6 is a partial perspective view of the mechanism of FIGURE 2 showing further interconnections thereof with a typewriter.

Some functional or non-character printing operations of the typewriter 10 may require a different form of interconnection with the transducer T. A typical non-printing function is upper and lower case shift which can be performed by mechanism like that described in U.S. Patent No. 3,157,265, issued to L. E. Palmer and entitled, "Print Interlock for Typewriter." Characteristic of that case shift mechanism is a cam detent arm that is oscillated back and forth upon each shift operation and a shift keylever having two operative positions corresponding to the two shift states. A similar shift detent arm 16 and a shift control key 17 are shown in FIGURE 6. As described in aforesaid U.S. Patent No.

3,157,265, depression of key 17 will cause shift from lower case to upper case, and release of key 17 will reverse the operation to return the typewriter to lower case. It will also be understood that the typewriter must be retained in either upper or lower case during the typing of characters subsequent to the shift operation itself.

Control of the shift operation by transducer T is achieved through a special transfer link 100 which includes a probe link 101 that cooperates with the record 20 in a manner identical to that previously described. During a read operation, rightward movement of the transfer link 100 in response to sensing of a "down" chad 21, pulls an output rod 102 rightwardly. A pawl 103 on rod 102 indexes a cam ratchet 104 to rotate a keylever operating cam 105 one-eighth of a turn. The cam 105 is shown in a lower case position wherein key 17 is permitted to be at the upward end of its stroke. Indexing of cam 105 places follower 106 in cooperation with a low dwell or flat portion of the cam 105 and spring 106a pulls key 17 downwardly causing the typewriter to shift to upper case. Cam 105 will be retained in this position by a detent 104a until a subsequent "down" chad 21 is sensed by the probe link 101. The subsequent "down" chad causes indexing of the cam 105 another eighth turn. Follower 106 is driven upwardly against spring 106a to permit key 17 to rise and cause the typewriter to return to lower case.

As mentioned above, the shift detent arm 16 of the typewriter is oscillated up and down each shift operation whether from lower to upper case or from upper case to lower case. This oscillatory motion is conveniently employed for recording shift operations when the machine is in a "record" mode. Shift detent arm 16 is connected by a shielded cable 107 to a dual function bellcrank 108. Bellcrank 108 first operates to disconnect pawl rod 102 from transfer link 100 by lifting connecting pin 102a to the upper leg of an L-shaped slot 100a and then, by engagement with a pin 100b, pulls the transfer link 100 to the right as described in connection with other record operations. Pawl 103 is reconnected to the transfer link 100 by bias spring 100c as the transfer link is restored leftwardly to its home position. It will be noted that a race condition exists between the shift detent arm 16 and the keylever operating cam 105 in the playback or "read" mode. Shift detent arm 16, however, does not operate until a significant time after depression of key 17, at which time transfer link 100 has moved to its rightward position as required to operate the key 17 and shielded cable 107 is slack, thus preventing unwanted disconnection of the pawl rod 102.

It can be recognized that the concepts employed in connecting the shift function to the transfer link 100 can be similarly adapted wherever different mechanical members are used to control an operation as for the "read" operations and for providing powered motion during the operation as required for "writing" operations. For example, separate input and output connections might be required to connect the typing mechanism of a conventional powered typebar typewriter to a transducer as herein disclosed.

Those skilled in the art will recognize that I have provided a mechanical read-write transducer having many functional capabilities heretofore available only in electrical or electromagnetic systems and that a number of basic automatic typing functions can be performed by a typewriter provided with my mechanical transducer at minimum additional cost.

While a particular preferred embodiment of my inventive concepts has been disclosed herein for purposes of illustration, it is to be understood that various modifications, additions and deletions thereto can be made without departing from the scope and spirit of my invention as particularly defined by the appended claims.

I claim:

1. Mechanical read-write mechanism for selectively receiving or transmitting data representative mechanical motion, and cooperable with data storage media having at least one column of successive data locations each comprising a repeatably settable, bistably positionable projecting portion, and including means for moving the media along a path to bring successive data locations to a read-write station, wherein the improvement comprises:
  - a transfer link associated with each of said columns and mounted for reciprocating movement,
  - a projecting probe supported by each of said transfer links in cooperative alignment with a column of said data locations of said media for assuming either a first or a second position in response to respectively one or the other position of an associated media projection portion positioned at said read-write station,
  - means including a selectively operable read drive member and operative when conditioned by said projecting probe assuming its second position to drive said transfer link along its path of reciprocation and thereby produce output mechanical motion, and
  - means for driving said projecting probe to displace a media projecting portion positioned at said read-write station from said one position thereof to its other position upon reciprocation of said transfer link in response to input mechanical motion received thereby independently of said read drive member.

2. In combination with mechanical read-write mechanism as defined in claim 1, a printer having a keyboard, and a plurality of movable control members that are normally operated by the keyboard to control various printer functions wherein:
  - each of said control members is connected with a corresponding one of said transfer links for movement therewith.

3. The combination as defined in claim 2 wherein certain functions of said printer are performed in sequential cycles and including means for initiating each cycle of said certain functions, wherein the improvement further comprises:
  - means responsive to movement of any transfer link corresponding to a control member for controlling any of said certain functions for operating said cycle initiating means.

4. Mechanical read-write mechanism as defined in claim 1 wherein the improvement further comprises:
  - means for displacing the media projecting portions at a data location of the media from said other position to said one position.

5. A printer as defined in claim 2 wherein the improvement further comprises:
  - means for displacing the media projecting portions at a data location of the media from said other position to said one position.

6. Mechanical read-write mechanism as defined in claim 1 wherein said projecting probe is an integral part of a probe link supported by an associated transfer link having three primary positions having a drive surface, and a camming surface, said probe link being with respect thereto:
  - a first position wherein said projecting probe is in its first position and said drive surface is out of a cooperating relationship with said read drive member,
  - a second position wherein said projecting probe is in its second position and said drive surface is in a cooperating force transfer relationship with said read drive member, and
  - a third position wherein said projecting probe is displaced transversely of its supporting transfer link by said camming surface and said projecting probe is driven to displace a media projecting portion at said read-write station from said one position thereof to said other position, and means resiliently biasing said probe link to its first position.

7. Mechanical read-write mechanism as defined in claim 6 wherein:

said camming surface comprises a slot in said probe link, and said associated transfer link supports said probe link by a pin that engages said slot.

8. A printer as defined in claim 2 further having a backspace mechanism and further comprising means mechanically interconnecting said backspace mechanism with said media moving means to incrementally move said media between data locations in the reverse direction upon each operation of said backspace mechanism.

References Cited

UNITED STATES PATENTS

| | | | |
|---|---|---|---|
| 2,762,931 | 9/1956 | Schewe | 178—112 XR |
| 2,919,002 | 12/1959 | Palmer | 197—16 |
| 2,949,226 | 8/1960 | Lubkin | 235—61.12 XR |
| 3,086,635 | 4/1963 | Palmer | 197—16 |
| 3,095,502 | 6/1963 | Sikora | 235—61.12 |
| 3,157,265 | 11/1964 | Palmer | 197—16 |

ROBERT E. PULFREY, *Primary Examiner.*

E. S. BURR, *Assistant Examiner.*